May 21, 1963   R. S. ZEBARTH ET AL   3,090,486
APPARATUS FOR SEPARATING MEAT FROM BONES
Filed Feb. 1, 1960   3 Sheets-Sheet 2
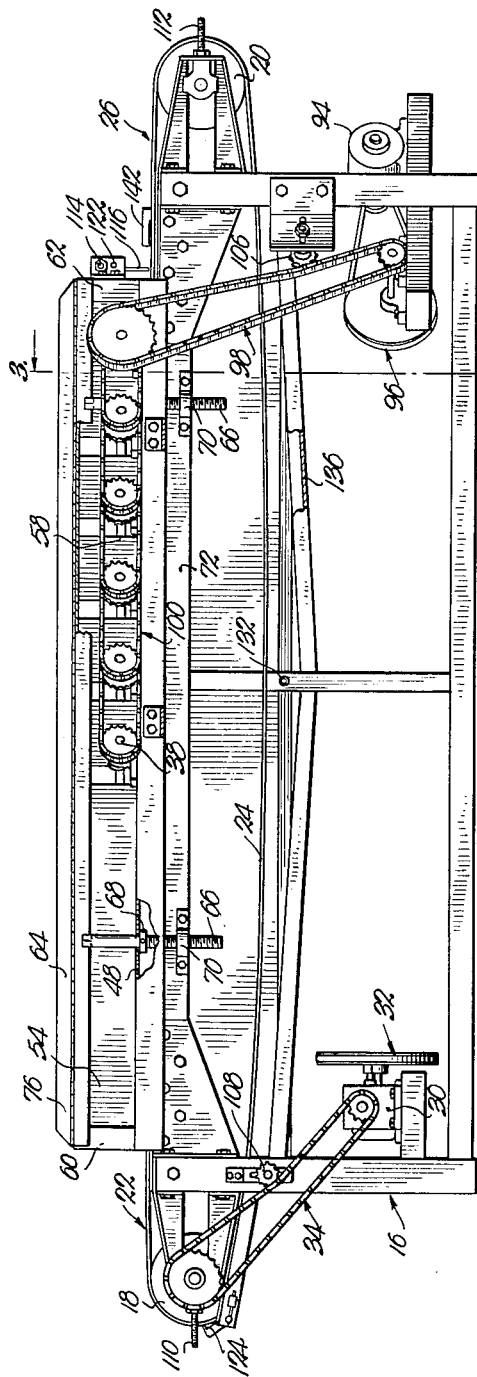
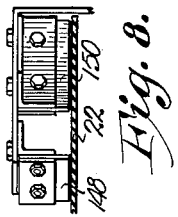
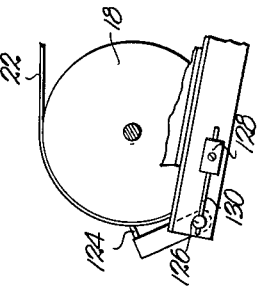
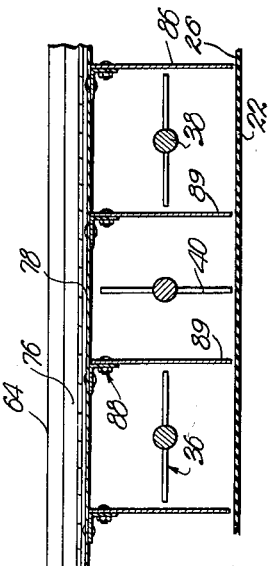
INVENTORS.
Ralph S. Zebarth
Harry J. Friend
BY Adoniram J. Churchill
ATTORNEYS May 21, 1963 R. S. ZEBARTH ET AL 3,090,486
APPARATUS FOR SEPARATING MEAT FROM BONES
Filed Feb. 1, 1960 3 Sheets-Sheet 3

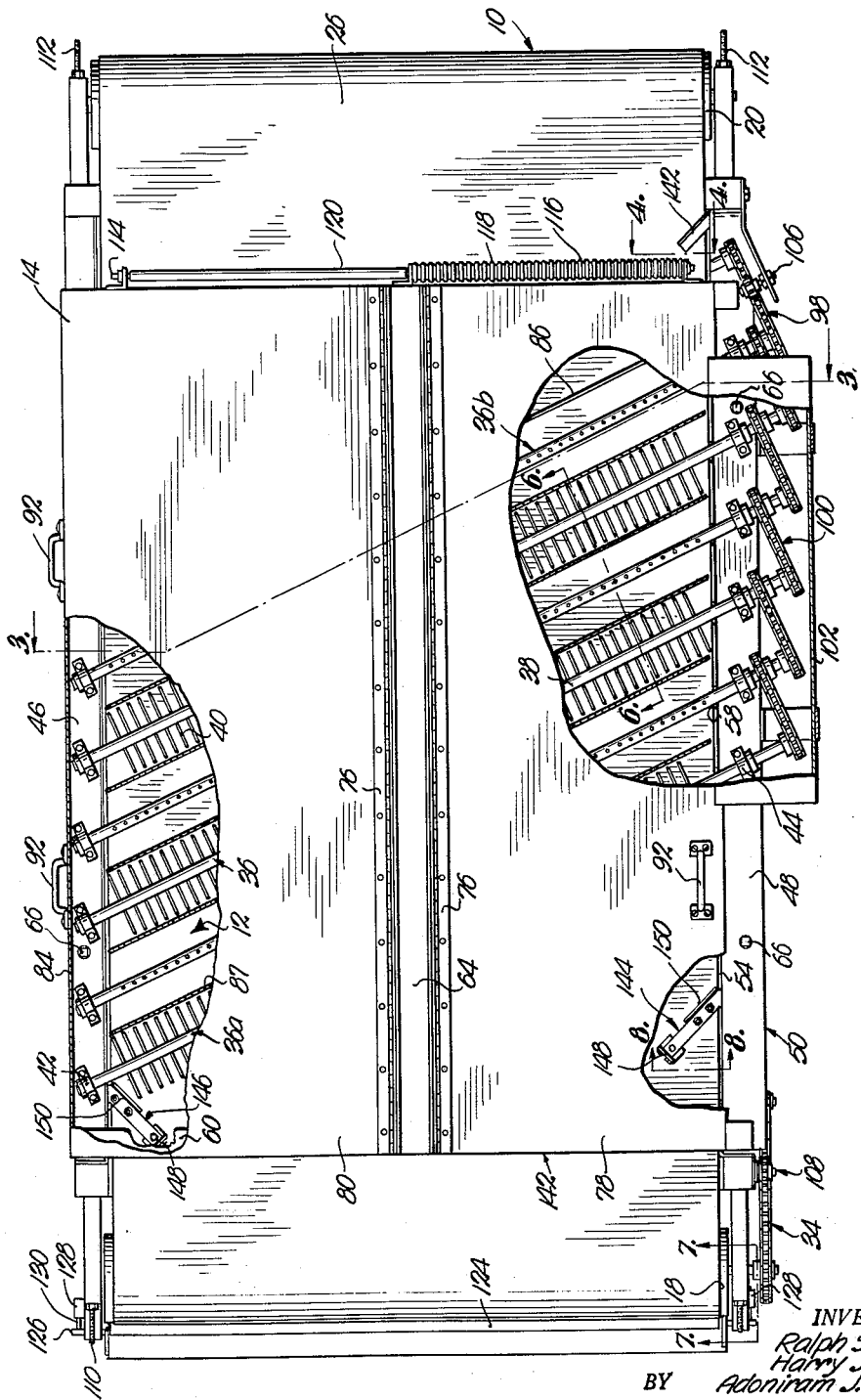

INVENTORS.
Ralph S. Zebarth
Harry J. Friend
BY Adoniram J. Churchill

Covey, Schmidt, Johnson & Hovey
ATTORNEYS.

United States Patent Office 3,090,486
Patented May 21, 1963

3,090,486
APPARATUS FOR SEPARATING MEAT FROM BONES
Ralph S. Zebarth, Kansas City, Mo., and Harry J. Friend, Miami, and Adoniram J. Churchill, Opa-Locka, Fla., assignors to Gordon Johnson Company, Kansas City, Mo., a corporation of Missouri
Filed Feb. 1, 1960, Ser. No. 5,815
8 Claims. (Cl. 209—90)

This invention relates to the processing of food products, and more particularly to the separation of edible materials from waste as, for example, meat particles from bones, the primary object being to automatically deflect the bones to a point of disposal after such bones are raked from the meat during continuous advancemen of the admixture along a predetermined path of travel.

The instant invention is adapted especially for use in connection with the preparation of poultry for market and in this connection, it is recognized that new processing methods are needed because of the public demand primarily for those parts of the bird which contain a substantial amount of meat in comparison with the bone content. In other words, the thighs and legs, for example, sell more readily than the back and other parts which are comparatively low in meat content and contain many small bones.

Accordingly, it is economically feasible to remove the meat from the backbones, from the neck, ribs and other comparable portions of the poultry and to package such meat separately for sale to be used in soups and other dishes in a manner that is different from the normal and usual ways of cooking poultry parts.

Hence, such line of approach requires an initial cooking of the bony portions of the bird to loosen the particles of meat, followed by a separation of the cooked meat from the bones, since even after cooking, much of such meat continues to cling to the bones particularly in confined zones.

One type of automatic apparatus for effecting such shredding of the cooked meat from the bones, includes a continuous belt conveyor having flexible fingers on the surface thereof, operating in conjunction with a fingered platen that may be either stationary or caused to gyrate. The cooked meat and the bones are directed between the platen and the conveyor and effectively shreds, tenderizes and removes the meat from the bones, and when the mixture emanates from such machine there is little, if any, loss insofar as additional meat still clinging to the bones.

After such operation it is, of course, necessary to remove all of the bones before the meat can be packaged and such operation is impractical if it became necessary to separate the bones by hand. It is accordingly, the most important object of the present invention to provide apparatus that will receive the admixture and produce an end product that is free of bones, all without substantial operator attention and with such efficiency that a minimum of inspection is necessary before the meat itself is packaged ready for distribution in trade channels.

Another important object of the present invention is to provide apparatus of the aforementioned character that operates in a manner similar to a side delivery rake except that the rotary raking mechanism is stationary with respect to a conveyor belt that continuously advances the admixture and subjects the bones to the action of the raking devices while the meat is permitted to continue in advancement to a point of collection.

Another important object of the instant invention is the provision of apparatus that not only rakes the bones out of the meat, but deflects the same in a rearward direction to the end that at all times the meat continues to move, whereas the movement of the bones is not only impeded, but reversed during continuous operation of the apparatus.

Still further, it is an important object of the instant invention to not only rake the bones from the meat and collect such bones behind the reels, but to continuously feed the removed material to a point of discharge along one side of the conveyor.

Another important object of the present invention is the provision of baffling or deflecting structure for causing the projected bones to continuously gravitate back to the conveyor and ultimately be discharged therefrom, whereby the reels may be rotated at relatively high speeds without flinging the projected bones forwardly and back into the cleaned meat product.

Other objects of the instant invention include the provision of means for stripping the meat from the conveyor at the discharge end of the conveyor; means beneath the conveyor for maintaining the latter in a clean condition at all times, thereby avoiding continuous buildup of the materials on the belt; the inclusion of means to vary the operating capacity of the machine, dependent upon the effectiveness of bone removal; the inclusion of gathering features at the edges of the belt to permit collection of bone particles which may escape the raking mechanism; and other advantageous features to be made clear as the following specification progresses.

In the drawings:

FIG. 1 is a plan view of apparatus for separating meat from bones made pursuant to our present invention, parts being broken away for clearness.

FIG. 2 is a side elevational view thereof, parts being broken away to reveal details of construction.

FIG. 3 is an enlarged, vertical, cross-sectional view taken on lines 3—3 of FIGS. 1 and 2.

FIG. 4 is a fragmentary, detailed, cross-sectional view taken on line 4—4 of FIG. 1.

FIG. 5 is a fragmentary, detailed, cross-sectional view taken on line 5—5 of FIG. 4.

FIG. 6 is an enlarged, fragmentary, detailed cross-sectional view taken on line 6—6 of FIG. 1.

FIG. 7 is an enlarged, fragmentary, detailed cross-sectional view taken on line 7—7 of FIG. 1; and FIG. 8 is an enlarged, fragmentary, detailed cross-sectional view taken on line 8—8 of FIG. 1.

The essential components of the apparatus illustrated in the drawings are conveyor 10, rotary side delivery separating mechanism 12 located above the conveyor 10, and housing means 14 for the mechanism 12.

Suitable framework 16 is provided for supporting horizontally spaced drums 18 and 20 around which the belt, forming a part of the conveyor 10, is trained. It is to be noted that such belt of the conveyor 10 has an uppermost stretch 22 and a lower stretch 24, the former of which has an upwardly-facing horizontal surface that is designated by the numeral 26.

Conveyor 10 is driven by an electric motor or other prime mover 28 (FIG. 3) supported by the framework 16, which drives gear reduction unit 30 (FIG. 2) through belt and pulley means 32. Chain and sprocket wheel means 34 operably couples the unit 30 with the drum 18 forming a part of the conveyor 10.

The mechanism 12 consists of a plurality of identical reels 36, each of which has an elongated shaft 38, shafts 38 preferably being parallel and extending obliquely across the surface 26 and spaced thereabove.

Each shaft 38 has a plurality of longitudinally extending, circumferentially spaced rows of spaced-apart teeth 40 extending radially from shaft 38 entirely across the surface 26 of the stretch 22. Shafts 38 are supported by bearings 42 and 44 at the ends thereof which are in turn mounted on a pair of horizontally-spaced, parallel beams 46 and 48 forming a part of a secondary frame 50 movably carried by the framework 16. Side plate 54 inwardly of beam 48 in parallelism therewith, is rigid to framework 16 and provided with clearance openings 58 for the shafts 38.

In addition to the beams 46 and 48, the secondary frame 50 includes a pair of U-shaped spanners 60 and 62 rigidly interconnecting the beams 46 and 48 and a longitudinal member 64 rigidly interconnecting the spanners 60 and 62.

The entire secondary frame 50 and the equipment carried thereby are supported by the framework 16 through employment of screw members 66 rotatable in beams 46 and 48 and supporting the latter through the medium of set collars 68 on the screw members 66. Screw members 66 are threaded in nuts 70 rigid to side bars 72 of framework 16, which bars 72 interconnect a plurality of legs 74 forming a part of framework 16. Through use of a suitable tool applied to the flats at the upper ends of the screw members 66, the clearance between the teeth 40 and the surface 26, may be varied. At this juncture, it is to be recognized also that there is sufficient yieldability in the frame 50 to permit tilting of the reels 36 with respect to the upper stretch 22. In other words, it is desirable at times to make adjustments such that the shafts 38 are out of parallelism with the surface 26 and the degree of angularity between the shafts 38 and the surface 26 need not necessarily be the same in all of the shafts 38 for most efficient operations.

The member 64 supports, through the medium of hinge means 76, a pair of horizontal panels 78 and 80 that serve as covers in substantially housing the mechanism 12 except at the inlet and outlet ends of housing means 14. Cover panel 78 has a down-turned flange 82 that overlaps plate 54 and a similar flange 84 on cover panel 80 partially overlaps the beam 46 thereby enclosing bearings 42 within the housing means 14. The ends of the panels 78 and 80 rest on the spanners 60 and 62.

The reels 36 are separated by a plurality of vertical baffles 86 and 87 rigid to, and depending from the panels 78 and 80 respectively and terminating at their lowermost longitudinal edges 89 above the surface 26 a distance slightly greater than the distance between the teeth 40 and surface 26 of belt stretch 22 but, such distance may be varied by virtue of the fact that the baffles 86 and 87 are carried by the panels 78 and 80 through the medium of slot and fastener means 88.

Baffles 90 are supported in the same manner from the member 64 and remain stationary when cover panels 78 and 80 are swung open through use of handles 92. It is thus seen that each reel 36 is embraced by a pair of parallel baffles 86—87—90 except only for the last reel 36a wherein no such baffling means is needed between reel 36a and the outlet end of the housing means 14.

The reels 36 are rotated continuously and simultaneously at relatively high speeds compared with the speed of the conveyor, through use of a single electric motor or other prime mover 94 carried by framework 16 and coupled with the leading reel 36b through belt and pulley means 96 and chain and sprocket means 98. The reel 36b is in turn coupled with the remaining reels 36 through a plurality of chain and sprocket units 100 disposed outwardly of bearings 44 and enclosed within a casing 102 that may be swung open about hinge means 104 to clear panel 78 for swinging the latter upwardly (together with its baffles 86) about corresponding hinge means 76.

An adjustable idler 106 is provided for the chain of the unit 98 to permit the aforedescribed adjustments made through manipulation of screw members 66. Similar provision is made in an adjustable idler 108 for the chain of the drive means 34 to the end that the tightness of the belt may be varied through adjustments 110 and 112 for the drums 18 and 20 respectively.

The spanner 62 at the inlet end of the housing means 14 supports a horizontal rod 114, which in turn supports a plurality of pins 116 that are looped around the rod 114 at their uppermost ends and terminate adjacent the surface 26, the distance between the pins 116 being determined by spacers 118 on rod 114. The pins 116 extend from beam 48 to the member 64, and rod 114 supports an elongated gate 120 between member 64 and beam 46, the gate 120 having an elongated, arcuate portion looped over rod 114 and a flat portion integral with the arcuate portion and depending therefrom. Such gate 120 is freely swingable in the manner of the pins 116 and terminates at the lowermost edge of the flat portion thereof adjacent the surface 26 of belt stretch 22.

While the pins 116 and the gate 120 are free to swing inwardly into the housing means 14, they are prevented from outward swinging movement by a rod 122 parallel and coextensive in length with the rod 114.

A scraper blade 124 is provided for the belt adjacent the drum 18, blade 124 extetnding transversely thereacross and being carried for swinging movement toward and away from the belt by a pintle 126. Blade 124 is held biased against the belt by counterbalance weights 128 adjustable along lateral extensions 130 secured to pintle 126.

The lower surface of the stretch 24 is continuously cleaned by a water spray directed to a manifold pipe 132 mounted on framework 16 beneath the stretch 24 transversely thereof and having a plurality of upwardly-directed nozzles 134. The liquid and material removed from the belt are collected by a pan 136 which may in turn be suitably drained to waste in any desired manner.

Stretch 22 is supported by a panel 138 mounted on bars 72 and additionally supported by suitable framing 140.

The material deposited on the surface 26 adjacent drum 20 is deflected inwardly before entering the housing means 14 by an angularly disposed baffle 142 (see FIGS. 1 and 2), carried adjacent pins 116 by the proximal bar 72.

A pair of different types of deflectors 144 and 146 are mounted on the bars 72 adjacent the outlet end of housing means 14. The deflectors 144 and 146 converge as the outlet of the housing means 14 is approached, and each is in turn provided with a pair of baffles 148 and 150 adjacent the stretch 22 and angled relatively to present a substantially V-shaped mouth for receiving material being advanced by the stretch 22. The proximal ends of the baffles 148 and 150 of each deflector 144–146 are spaced to present an outlet end through which the gathered material continues to travel toward the scraper blade 124.

In operation, meat and bones which have been previously cooked and the meat shredded from the bones as hereinabove explained, are deposited as an admixture on the upper surface 22 of the belt stretch 26 for advancement thereby past the pins 116 into the housing means 14. It is to be preferred that, for the most part, the deposit be made along one side of the conveyor adjacent the pins 116 since the action of the mechanism 12 is such as to cause the removed bones to shift toward that edge of the belt proximal to the bearings 42. But, the gate 120 also swings inwardly and any such admixture that tends to shift laterally toward the gate 120 will also either move therebeneath or force the gate inwardly. On the other side of the belt, the baffle 142 tends to keep the material away from the proximal edge of the belt and from escape beneath the lower edge of plate 54.

As the admixture advances rather slowly, it is subjected to the action of the teeth 40 of the first reel 36b, which effect a combing or raking action to remove the bones while permitting the meat to continue in its advancement. It is important to note that the shafts 38 all rotate counterclockwise (viewing FIG. 2), i.e., in the same direction of rotation of the drums 18 and 20. Hence, the bones that are raked from the meat are projected rearwardly in a direction opposite to the direction of advancement that is effected by the belt.

Such projection of the bones by the teeth 40 is also upward, and as a consequence, many of the bones are not merely retarded against advancement by the belt, but are forced against the baffles 86, 87 and 90 behind the first reel 36b. In fact, the high speed rotation of the reels 36 is such that, except for the panels 78 and 80, many of the bones would be flung forwardly over the reels and toward the discharge end of the conveyor. However, those bones that do tend to fly upwardly, are deflected back down toward the belt stretch 22 by the panels 78 and 80.

It is to be noted also that, by virtue of the oblique disposition of the reels 36 with respect to the direction of advancement of the materials, the bones tend to be deflected or projected laterally of the belt toward the bearings 42. As this action continues, the bones ultimately drop off the belt adjacent the flange 84 whence they gravitate, to a collection point below said flange 84 and adjacent framework 16 and broadly denoted by the numeral 152 (FIG. 3).

The aforementioned action on the part of the reel 36b is continued by the successive reels 36 and by the time the meat reaches the outlet of the housing 14, it is cleaned of all bones except perhaps fragments that may tend to pass the mechanism 12 along the edges of the belt. Such material is gathered by the deflectors 144 and 146 into a narrow stream or row emanating from between the two baffles 148 and 150 of each deflector. It is a simple procedure thereupon to collect each of such streams at the discharge end of the conveyor and re-deposit the same upon the belt at the opposite end for further processing.

The meat that tends to cling to the belt is scraped therefrom by the action of the blade 124, and the belt is kept clean at all times to avoid a progressive accumulation of the material, especially the juices therefrom by the action of the liquid emanating from the spray nozzles 134.

The operation depends much upon the various adjustments that are made, including the speed of advancement of the belt, the speed of rotation of the reels, and the distance between the teeth 40 and the upper surface 26. The condition of the meat and bones as the same are fed to the apparatus, will determine such adjustments and the entire operation can be speeded substantially whenever it is determined that the bones have all been removed long before reaching the last reel 36a. Increasing the distance between the reels and the belt reduces the amount of material that is projected rearwardly by the mechanism 12, and variance in the tilt between the shafts 38 and the surface 26 determines the rate of movement of the bones to the discharge side of the conveyor, as well as the distribution of the material across the entire surface 26 as the material moves toward the discharge end of the conveyor.

In some instances it may be desirable to progressively decrease the distance between the teeth 40 and the surface 26 as the reel 36a is approached, and it may also be desirable to progressively decrease the distance between the teeth 40 and the surface 26 as the bearings 42 are approached. This is all accomplished by independent adjustment of the four screw members 66, two of which support each beam 46 and 48 respectively.

Having thus described the invention what is claimed as new and desired to be secured by Letters Patent is:

1. Apparatus of the kind described comprising in combination, a continuous belt conveyor having an upwardly-facing, horizontal surface for receiving and advancing an admixture of meat and bones, each consisting of particles of various sizes and shapes; rotary side delivery separating mechanism above said surface including a toothed reel disposed to engage the admixture and rake the bones out of the meat while permitting the latter to continue to advance; means coupled with the reel for rotating the same in a direction to cause the teeth thereof to project the bones oppositely to the direction of advancement by the conveyor; baffle structure behind said reel and disposed for deflecting the projected bones whereby the same continue to gravitate to said surface; and means supporting the reel obliquely to said direction of advancement whereby the bones are deposited alongside the conveyor.

2. Apparatus of the kind described comprising in combination, a continuous belt conveyor having an upwardly-facing, horizontal surface for receiving and advancing an admixture of meat and bones, each consisting of particles of various sizes and shapes; rotary side delivery separating mechanism above said surface including a toothed reel disposed to engage the admixture and rake the bones out of the meat while permitting the latter to continue to advance; means coupled with the reel for rotating the same in a direction to cause the teeth thereof to project the bones oppositely to the direcion of advancement by the conveyor; means including baffle structure for housing the reel to confine the projected bones within a zone behind the reel for subsequent gravitation onto said surface; and means supporting the reel obliquely to said direction of advancement whereby the bones are deposited alongside the conveyor.

3. Apparatus of the kind described comprising in combination, a continuous belt conveyor having a pair of horizontally spaced ends and an upwardly-facing horizontal surface for receiving an admixture of meat and bones at one of said ends and advancing the same to the opposite of said ends, the meat and bones each consisting of particles of various sizes and shapes; rotary side delivery separating mechanism above said surface including a toothed reel disposed to engage the admixture and rake the bones out of the meat while permitting the latter to continue to advance; means coupled with the reel for rotating the same in a direction to cause the teeth thereof to project the bones oppositely to the direction of advancement by the conveyor and toward said one end of the conveyor; a blade traversing the belt at said opposite end of the conveyor for scraping the meat therefrom as the latter emanates from said opposite end; baffle structure behind said reel and disposed for deflecting the projected bones whereby the same continue to gravitate to said surface; and means supporting the reel obliquely to said direction of advancement whereby the bones are deposited alongside the conveyor.

4. Apparatus of the kind described comprising in combination, a continuous belt conveyor having an upwardly-facing, horizontal surface for receiving and advancing an admixture of meat and bones, each consisting of particles of various sizes and shapes; rotary side delivery separating mechanism above said surface including a reel having a shaft and a plurality of longitudinally-extending, circumferentially-spaced rows of spaced-apart teeth extending radially from the shaft across the belt and disposed to engage the admixture and rake the bones out of the meat while permitting the latter to continue to advance; means coupled with the reel for rotating the same in a direction to cause the teeth thereof to project the bones oppositely to the direction of advancement by the conveyor; baffle structure behind said reel and disposed for deflecting the projected bones whereby the same continue to gravitate to said surface; and means supporting the reel obliquely to said direction of advancement whereby the bones are deposited alongside the conveyor.

5. Apparatus of the kind described comprising in combination, a continuous belt conveyor having an upwardly-facing, horizontal surface for receiving and advancing an admixture of meat and bones, each consisting of particles of various sizes and shapes; rotary side delivery separating mechanism above said surface including a plurality of horizontally-spaced, parallel reels, each having a shaft and a plurality of longitudinally-extending, circumferentially-spaced rows of spaced-apart teeth extending radially from the shaft across the belt and disposed to engage the admixture and rake the bones out of the meat while permitting the latter to continue to advance; means coupled with the reels for rotating the same in a direction to cause the teeth thereof to project the bones oppositely to the direction of advancement by the conveyor; means supporting the reels obliquely to said direction of advancement whereby the bones are deposited alongside the conveyor; a vertical baffle behind each reel respectively for deflecting the projected bones whereby the same continue to gravitate to said surface; and means for raising and lowering the support for the reels and tilting the support whereby to vary the clearance between the teeth and said surface and the angularity of the axes of the shafts relative to said surface.

6. Apparatus of the kind described comprising in combination, a continuous belt conveyor having an upwardly-facing, horizontal surface for receiving and advancing an admixture of meat and bones, each consisting of particles of various sizes and shapes; rotary side delivery separating mechanism above said surface including a plurality of horizontally-spaced, parallel reels, each having a shaft and a plurality of longitudinally-extending, circumferentially-spaced rows of spaced-apart teeth extending radially from the shaft across the belt and disposed to engage the admixture and rake the bones out of the meat while permitting the latter to continue to advance; means coupled with the reels for rotating the same in a direction to cause the teeth thereof to project the bones oppositely to the direction of advancement by the conveyor; means supporting the reels obliquely to said direction of advancement whereby the bones are deposited alongside the conveyor; a vertical baffle behind each reel respectively and a horizontal panel connecting the upper edges of the baffles for deflecting the projected bones whereby the same continue to gravitate to said surface; and means for raising and lowering the support for the reels and tilting the support whereby to vary the clearance between the teeth and said surface and the angularity of the axes of the shafts relative to said surface.

7. Apparatus of the kind described comprising in combination, a continuous belt conveyor having an upwardly-facing, horizontal surface for receiving and advancing an admixture of meat and bones, each consisting of particles of various sizes and shapes; rotary side delivery separating mechanism above said surface including a plurality of horizontally-spaced, parallel reels, each having a shaft and a plurality of longitudinally-extending, circumferentially-spaced rows of spaced-apart teeth extending radially from the shaft across the belt and disposed to engage the admixture and rake the bones out of the meat while permitting the latter to continue to advance; means coupled with the reels for rotating the same in a direction to cause the teeth thereof to project the bones oppositely to the direction of advancement by the conveyor; means supporting the reels obliquely to said direction of advancement whereby the bones are deposited alongside the conveyor; a vertical baffle behind each reel respectively and a horizontal panel connecting the upper edges of the baffles for deflecting the projected bones whereby the same continue to gravitate to said surface, the baffles being coextensive in length with the reels and being carried by the support for the reels; means for raising and lowering the support for the reels and tilting the support whereby to vary the clearance between the teeth and said surface and the angularity of the axes of the shafts relative to said surface.

8. Apparatus of the kind described comprising in combination, a continuous belt conveyor having a pair of horizontally spaced ends and an upwardly-facing horizontal surface for receiving an admixture of meat and bones at one of said ends and advancing the same to the opposite of said ends, the meat and bones each consisting of particles of various sizes and shapes; rotary side delivery separating mechanism above said surface including a plurality of horizontally-spaced, parallel reels, each having a shaft and a plurality of longitudinally-extending, circumferentially-spaced rows of spaced-apart teeth extending radially from the shaft across the belt and disposed to engage the admixture and rake the bones out of the meat while permitting the latter to continue to advance; means coupled with the reels for rotating the same in a direction to cause the teeth thereof to project the bones oppositely to the direction of advancement by the conveyor and toward said one end of the conveyor; means supporting the reels obliquely to said direction of advancement whereby the bones are deposited alongside the conveyor; and gathering means above the conveyor between said mechanism and said opposite end of the conveyor for deflecting meat, and bones which escape the mechanism, inwardly from the edges of the conveyor and forming discrete rows thereof emanating from said opposite end of the conveyor.

References Cited in the file of this patent

UNITED STATES PATENTS

| 1,112,685 | Critchfield | Oct. 6, 1914 |
| 1,543,411 | Witting | June 23, 1925 |
| 2,656,921 | Gray | Oct. 27, 1953 |
| 2,710,097 | Bolles | June 7, 1955 |
| 2,817,862 | Frazho et al. | Dec. 31, 1957 |
| 2,906,308 | Genetti | Sept. 29, 1959 |
| 2,964,181 | Demarest | Dec. 13, 1960 |

FOREIGN PATENTS

| 561,246 | Germany | Oct. 12, 1932 |